(12) United States Patent
Williams et al.

(10) Patent No.: US 9,777,874 B2
(45) Date of Patent: Oct. 3, 2017

(54) ROTARY COUPLING

(71) Applicant: FREUDENBERG OIL & GAS, LLC, Houston, TX (US)

(72) Inventors: Steven Williams, Burlington, CA (US); Anton Marincic, Beamsville, CA (US); Zvonko Milanovic, Kirkland (CA)

(73) Assignee: Freudenberg Oil & Gas, LLC, Houston, TX (US)

( * ) Notice: Subject to any disclaimer, the term of this patent is extended or adjusted under 35 U.S.C. 154(b) by 162 days.

(21) Appl. No.: 14/717,104

(22) Filed: May 20, 2015

(65) Prior Publication Data
US 2016/0341345 A1 Nov. 24, 2016

(51) Int. Cl.
F16L 21/04 (2006.01)
F16L 27/08 (2006.01)

(52) U.S. Cl.
CPC ....... F16L 27/0861 (2013.01); F16L 27/0816 (2013.01); *F16L 21/04* (2013.01)

(58) Field of Classification Search
CPC .............................. F16L 27/0816; F16L 21/04
USPC .................... 285/281, 280, 278, 275
See application file for complete search history.

(56) References Cited

U.S. PATENT DOCUMENTS

| | | | | |
|---|---|---|---|---|
| 1,204,822 A | * | 11/1916 | Roylance | F16L 27/0812 285/280 |
| 1,525,101 A | * | 2/1925 | McWane | F16L 21/04 285/374 |
| 1,575,259 A | * | 3/1926 | Fisher | G01F 1/42 285/348 |
| 1,831,956 A | * | 11/1931 | Harrington | E21B 33/085 285/275 |
| 2,901,273 A | * | 8/1959 | Morris, Jr. | F16L 27/0865 285/281 |
| 3,411,526 A | * | 11/1968 | Schaefer | F16L 39/04 285/281 |
| 3,420,555 A | * | 1/1969 | Faccou | F16L 27/0828 285/276 |

(Continued)

FOREIGN PATENT DOCUMENTS

| | | | | |
|---|---|---|---|---|
| FR | 696784 A | | 1/1931 | |
| FR | 1246290 A | * | 11/1960 | .......... F16L 27/0816 |

(Continued)

*Primary Examiner* — David E Bochna
(74) *Attorney, Agent, or Firm* — Daniel J. Sepanik, Esq.; Harness, Dickey & Pierce, P.L.C.

(57) ABSTRACT

A rotary coupling includes an annular outer section which has a female end, a threaded portion, and a Z-ring relief. A connector pipe has a connection end, a shoulder, and a seal end. A Z-ring is housed within the Z-ring relief and packing seals are housed within a packing chamber; and a retainer ring is threadably received into the threaded portion of the outer section. The retainer ring receives compression screws there-through, wherein in the engaged position the compression screws urge a packing end of the Z-ring longitudinally against packing seals thereby compressing the packing seals into the packing chamber creating a seal. The compression screws are movable between an engaged and disengaged position in order that in the disengaged position the compression pressure against the Z-ring and packing seals is released by backing off the compression screws without disassembly of the rotary coupling.

17 Claims, 6 Drawing Sheets

(56) References Cited

U.S. PATENT DOCUMENTS

| | | | | |
|---|---|---|---|---|
| 3,679,235 A | * | 7/1972 | Faccou | F16L 27/0828 |
| | | | | 285/281 |
| 3,724,877 A | * | 4/1973 | Thut | F16L 27/0832 |
| | | | | 285/281 |
| 3,840,264 A | | 10/1974 | Bennett | |
| 4,221,408 A | * | 9/1980 | Lochte | F16L 27/0828 |
| | | | | 285/281 |
| 4,229,024 A | * | 10/1980 | Oberrecht | F16L 27/0845 |
| | | | | 285/281 |

FOREIGN PATENT DOCUMENTS

| | | | | |
|---|---|---|---|---|
| GB | 978461 A | * | 12/1964 | F16L 27/0816 |
| GB | 2132297 A | | 7/1984 | |

\* cited by examiner

ROTARY COUPLING

FIELD OF THE INVENTION

The present concept relates to pipe joints which accommodate pipe expansion and movement and more particularly to rotary joints between adjacent lengths of pipe which are interconnected to form a pipeline for carrying fluids which are under moderate to high pressure and temperature.

BACKGROUND OF THE INVENTION

Rotary couplings have been used in the oil and gas industry and also in other fluid handling industries for a number of years. Oil pipelines associated with exploration drilling commonly include a series of interconnected sections of steel pipe each of which include a male connecting piece at one end a female connecting piece at the other end. The inlets and outlets to be connected by such pipelines can be at various positions relative to one another. It is not always possible or practical to provide rigid pipelines particularly suited to all applications.

Consequently it is a common practice to interconnect lengths of pipe of various configurations using a rotary or swivel joint to accommodate dynamic pipe expansion relative axial rotation of adjacent lengths of pipe that can occur.

Rotary couplings often use annular sealing or packing rings axially compressed between adjacent internal radially extended faces of male and female connecting pieces.

In practice the reliability and maneuverability of rotary couplings has been an issue and therefore there is a need for a rotary coupling which is extremely reliable under severe conditions while also being easy to manipulate in the field.

SUMMARY OF THE INVENTION

The present concept of a rotary coupling comprising:
a) an annular outer section which includes a female end a threaded portion and a Z-ring relief;
b) a connector pipe which includes a connection end, a shoulder, and a seal end which is inserted into the female end of the outer section;
c) a Z-ring housed with the Z-ring relief and packing seals housed within a packing chamber;
d) a retainer ring threadably received into the threaded portion of outer section, the retainer ring receiving compression screws there-through, the screws for urging a packing end of Z-ring longitudinally against packing seals.

Preferably wherein the seal end of connector pipe includes a packing relief defined by a taper.

The present concept a rotary coupling comprising:
a) an annular outer section which includes a female end, a threaded portion, and a Z-ring relief;
b) a connector pipe which includes a connection end, a shoulder, and a seal end which is inserted into the female end of the outer section;
c) a Z-ring housed within the Z-ring relief and packing seals housed within a packing chamber;
d) a retainer ring threadably received into the threaded portion of outer section, the retainer ring receiving compression screws there-through, wherein in the engaged position the compression screws urging a packing end of Z-ring longitudinally against packing seals thereby compressing the packing seals into the packing chamber creating a seal.

Preferably wherein the compression screws moveable between an engaged and disengaged position such that in the dis-engaged position the compression pressure against the z-ring and packing seals is released by backing off the compression screws without disassembly of the rotary coupling.

Preferably wherein the Z-ring including an inner step portion and an outer step portion wherein the diameter of the inner step less than the diameter of the outer step.

Preferably further including a pipe gap between an abutment and a seal end of connector pipe 104.

Preferably wherein one wall of the packing chamber including the outer diameter of connector pipe 104.

Preferably wherein the seal end of connector pipe includes a packing relief defined by a taper.

Preferably wherein the boundaries of the packing chamber defined by the outer diameter of connector pipe, the packing end of the Z-ring, a chamber bottom and a chamber outer diameter of the outer section.

Preferably wherein the inner diameter of the packing relief is less than the outer diameter D2 of connector pipe 104.

Preferably wherein the taper includes a variation in the outer diameter of the connector pipe D2 and D1 wherein D2 is greater than or equal to D1 wherein D2 is closer to the seal end than D1.

BRIEF DESCRIPTION OF THE DRAWINGS

The present concept will now be described by way of example only with reference to the following drawings in which.

DETAILED DESCRIPTION OF THE PREFERRED EMBODIMENTS

Figure 3:
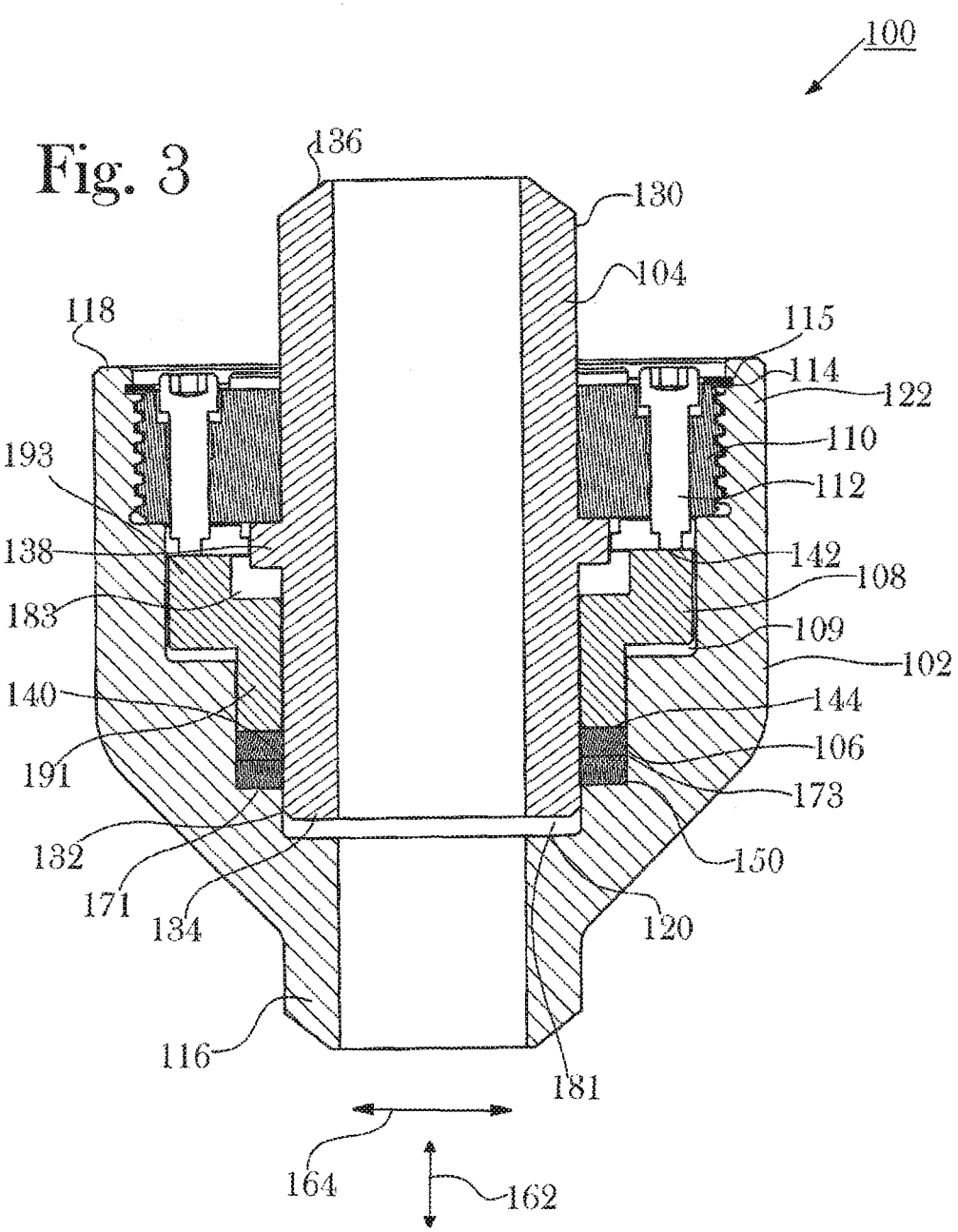
FIG. 3 is a schematic cross sectional view showing an outer section together with a connector pipe and the interconnecting pieces.
Figure 4:
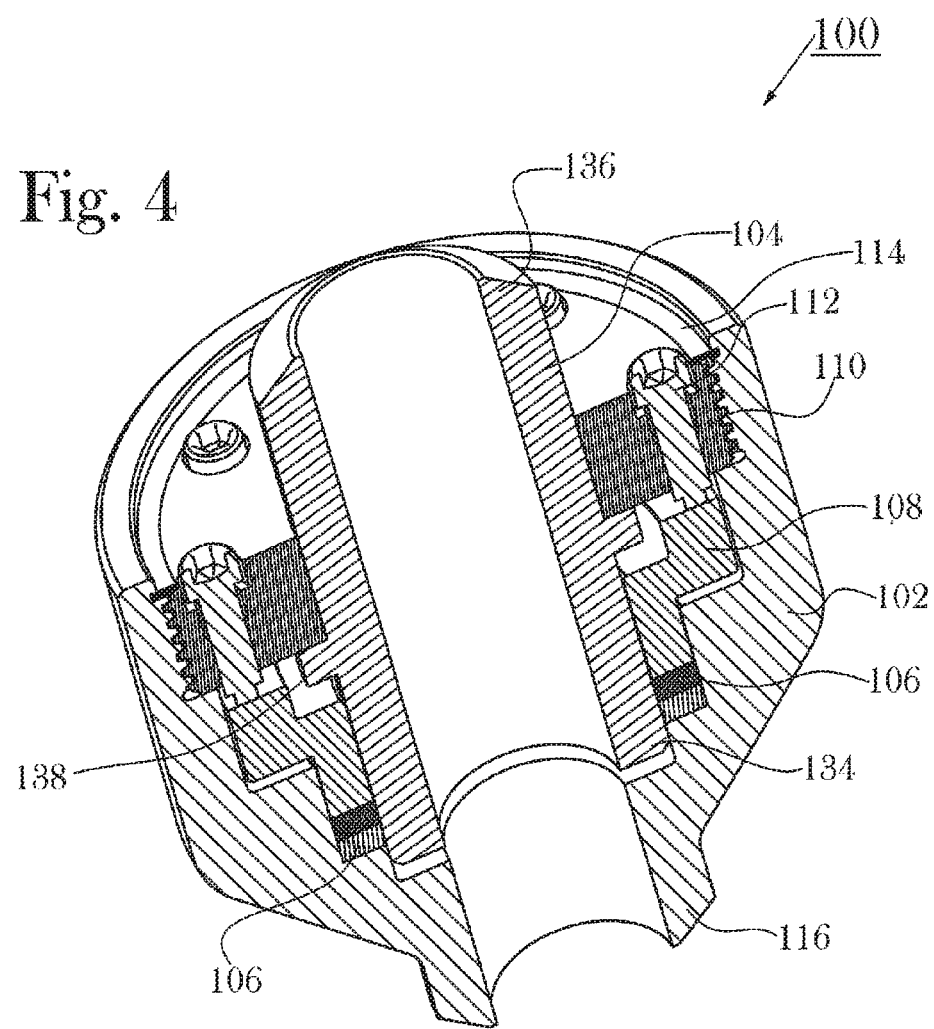
FIG. 4 is a schematic cross sectional perspective view of a rotary coupling showing an outer section together with a connector pipe and the interconnecting pieces.
Figure 5:
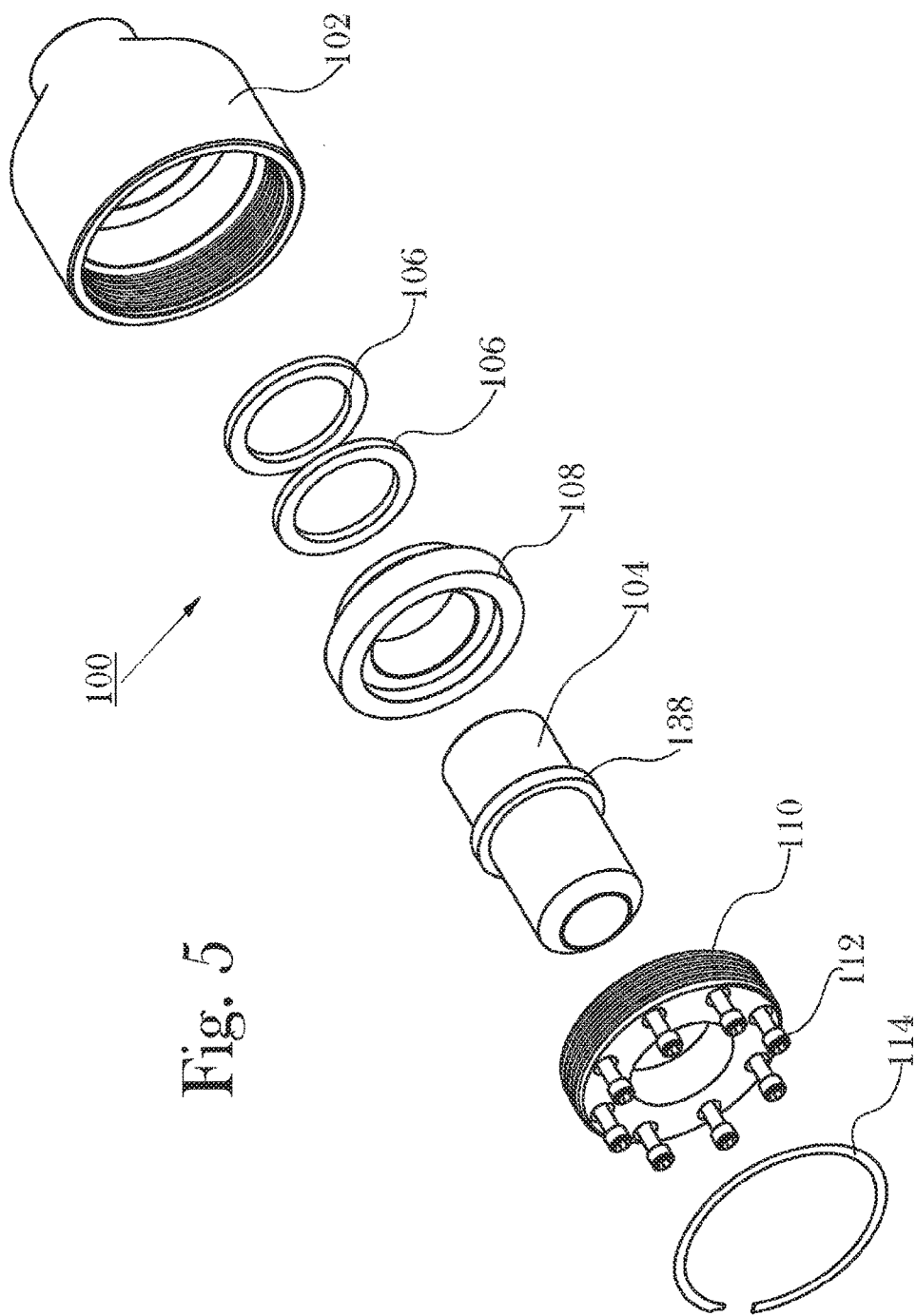
FIG. 5 is an exploded assembly view of the rotary coupling.

Referring first of all to FIG. 3 the present concept a rotary coupling is shown generally as 100 includes the following major components namely outer section 102, connector pipe 104, packing seals 106, Z-ring 108, retainer ring 110, compression screws 112, and snap ring 114.

Outer section 102 includes a male end 116, female end 118 abutments 120 and threaded portion 122. Z-ring 108 includes an inner step portion 191 and an outer step portion 193 wherein the diameter of the inner step less than the diameter of the outer step.

Connector pipe 104 includes an outer diameter D1 130, and outer diameter D2 132, a connector pipe end 134, a connection end 136, a shoulder 138 and a packing relief 140 having an inner diameter 141. Male end 116 and connection end 136 are connected to pipes normally by welding to the ends.

Outer section 102 is machined to accommodate a retainer ring 110 which engages with the threaded portion 122 of outer section 102.

Outer section 102 is furthered shaped with a Z-ring relief 109 to accommodate Z ring 108 as shown in FIG. 3. Compression screws 112 thread-ably engage through the retainer ring 110. Z-ring 108 further includes a screw end 142 and a packing end 144.

Figure 1:
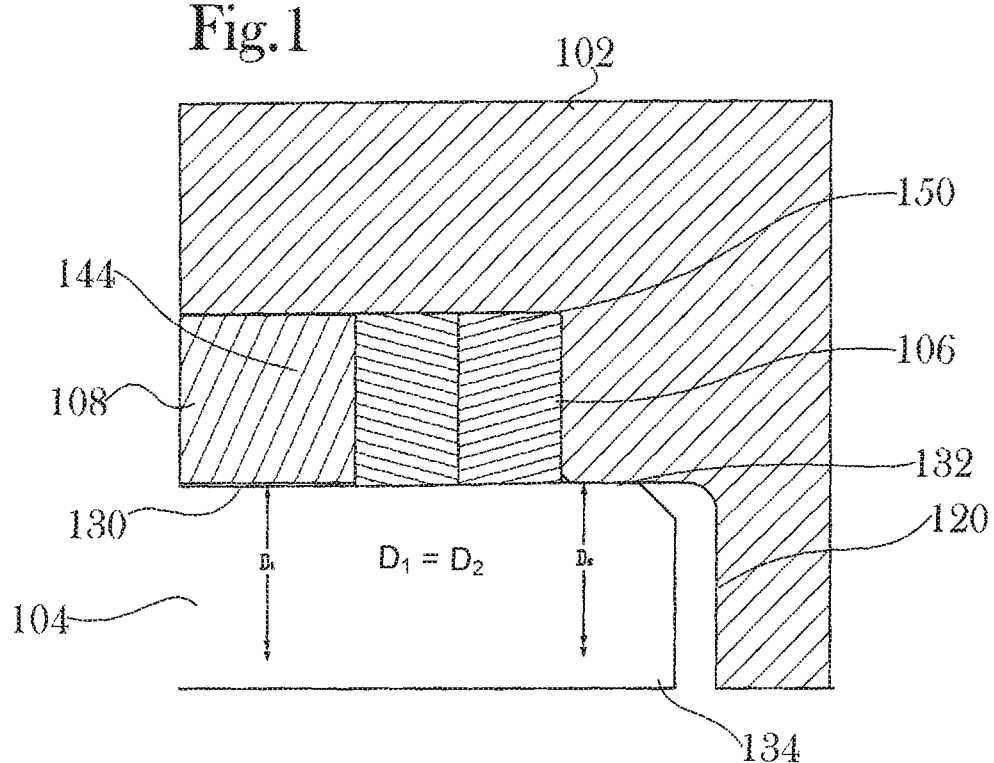
FIG. 1 is a partial cross sectional view of a portion of the outer section and the connector pipe together with a Z-ring and a packing seals.
Figure 2:
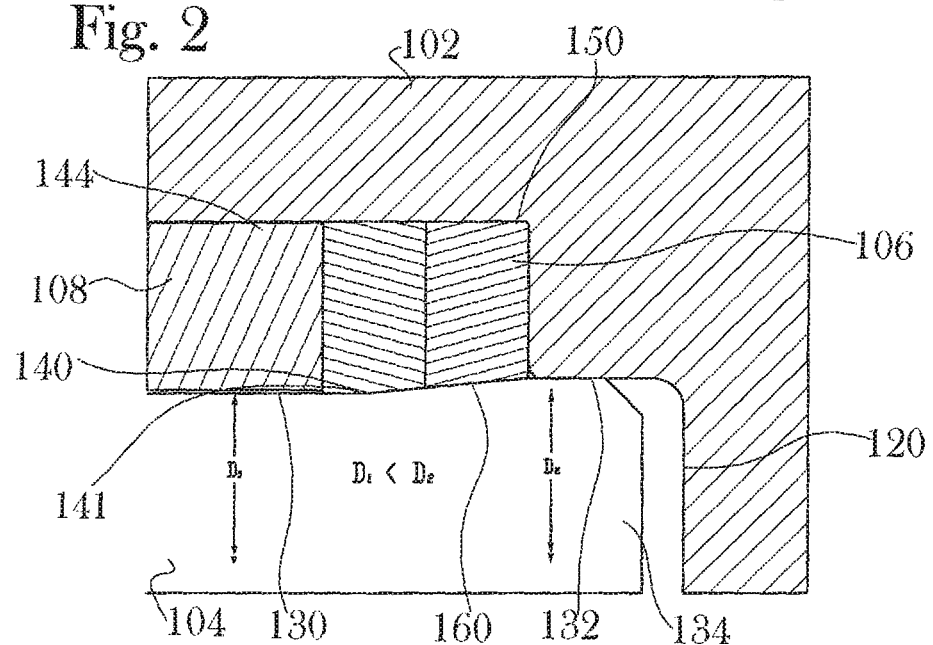
FIG. 2 is a partial cross sectional view of a portion of the outer section and the connector pipe together with a Z-ring and a packing seals.

Outer section 102 together with the seal end 134 of connector pipe 104 as well as the packing end 144 and Z-ring 108 define a packing chamber 150 which is shown in greater detail in FIGS. 1 and 2. Although not shown in the diagrams Z-ring 108 is machined or designed to accommodate D2 132. This may be accomplished by machining the Z-ring appropriately or using a split ring configuration.

The boundaries of the packing chamber 150 are defined by the outer diameters D1 and/or D2 of connector pipe, the packing end 144 of the Z-ring, a chamber bottom 171 and a chamber outer 173 diameter of the outer section.

In particular a packing relief 140 is defined by a difference in outer diameter of D2 shown as 132 and outer diameter D1 130 of connector pipe 104. In practice D2 is greater than D1 thereby creating a taper 160 within seal end 134 of connector pipe 104. Taper 160 may be linear or curved either concave or convex. It is possible that D1 and D2 may be equal i.e. with no taper.

The inventor surprisingly found that the packing relief 140 defined by taper 160 which is developed due to the change in the outer diameter D2 132 to D1 130 creates a substantially superior seal when using compression packing seals 106 of the type shown in FIGS. 1 through 5.

In use firstly Z-ring 108 is placed onto seal end 134 of connector pipe 104 followed by one or more annular packing seals 106.

Thereafter connector pipe 104 slips into female end 118 of outer section 102 followed by retainer ring 110 which is thread-ably received by threaded portion 122. Thereafter compression screws 112 are thread-ably engaged into retainer ring 110 and finally annular snap ring 114 is placed into ring groove 115.

Annular packing seals 106 are compressed by the thread-ably engaging compression screws 112 which abut against screw end 142 of Z-ring 108 which in turn abuts against packing seals 106 at packing end 144 of Z-ring 108. An advantage in the current design is the ability to tighten engage and loosen disengage compression screws 112. For example compression screws 112 could be tightened in place for pressure testing of the joint and then subsequently loosened for shipping an A-frame configuration 200 in a collapsed position and after on site installation retightening the compression screws 112.

By using the Z-ring 108 configuration one is able to locate the packing seals 106 as close as possible to the outer diameter of connector pipe 104, thereby reducing overall joint torque resistance. In comparison to ball and socket joints the present rotary joint 100 creates less rotational resistance even when compression screws 112 are fully engaged. In other words it takes significantly less torque to rotate rotary joint 100 than an ball and socket joint in the same application.

Further by utilizing a packing relief 140 namely by machining in a taper 160 wherein outer diameter D2 132 is greater than outer diameter D1 130 of connector pipe 104. This packing chamber 150 geometry improves seal performance.

In this manner annular packing seals 106 are compressed not only in the longitudinal direction 162 but there is also some movement or urging of the annular packing seal in the lateral direction 164 against the outer diameter D2 132 of connector pipe 104.

Figure 6:
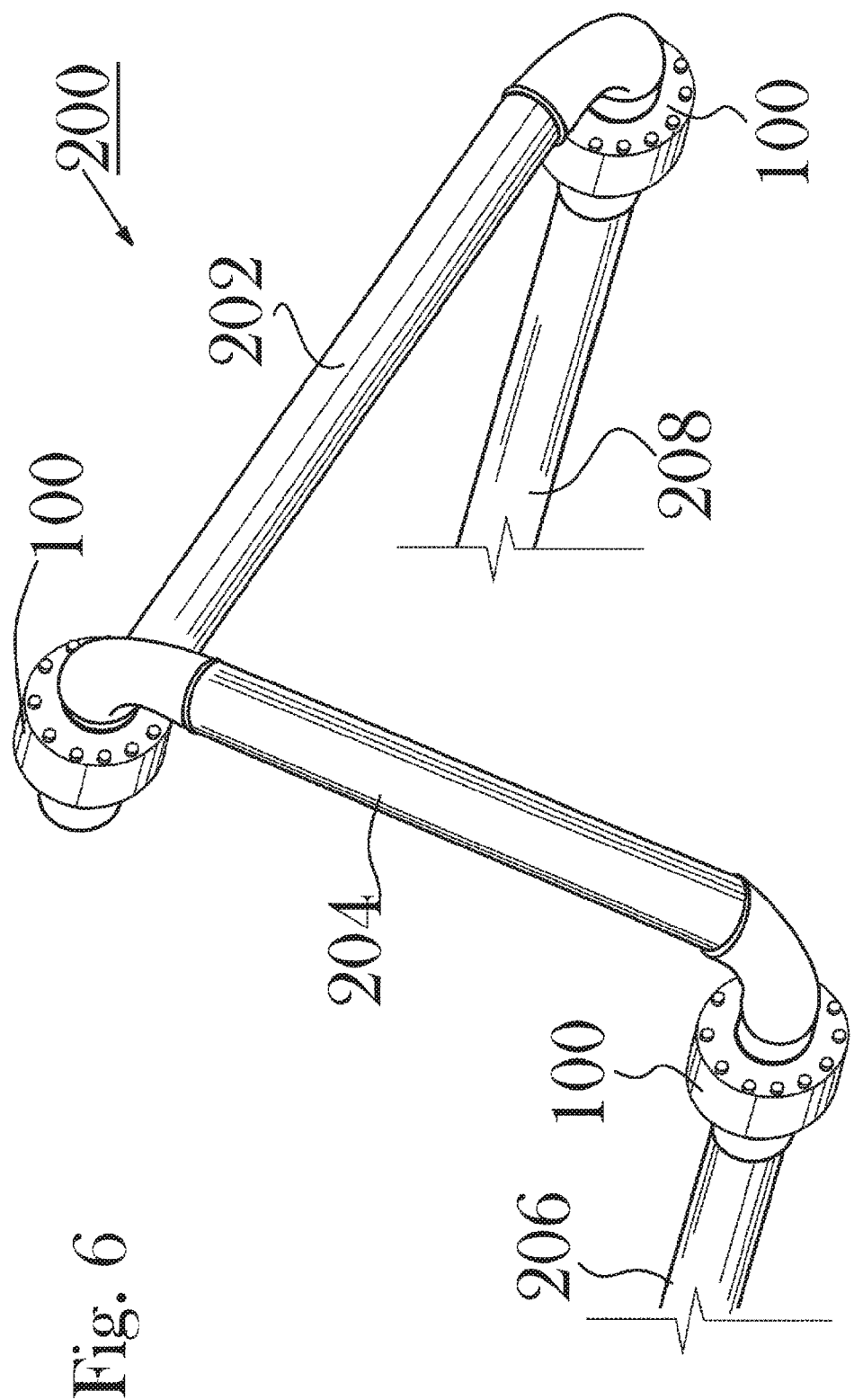
FIG. 6 is a schematic perspective view of an A-frame configuration shown using three rotary couplings.

Referring now to FIG. 6 which depicts an A frame configuration shown generally as 200 which includes the following components namely three rotary couplings 100, a joiner pipe 202, joiner part 204, inlet pipe 206, outlet pipe 208, and connector 210. The A frame configuration 200 depicted in FIG. 6 can be used to compensate for thermal expansion and movement of interconnected piping.

Figure 7:
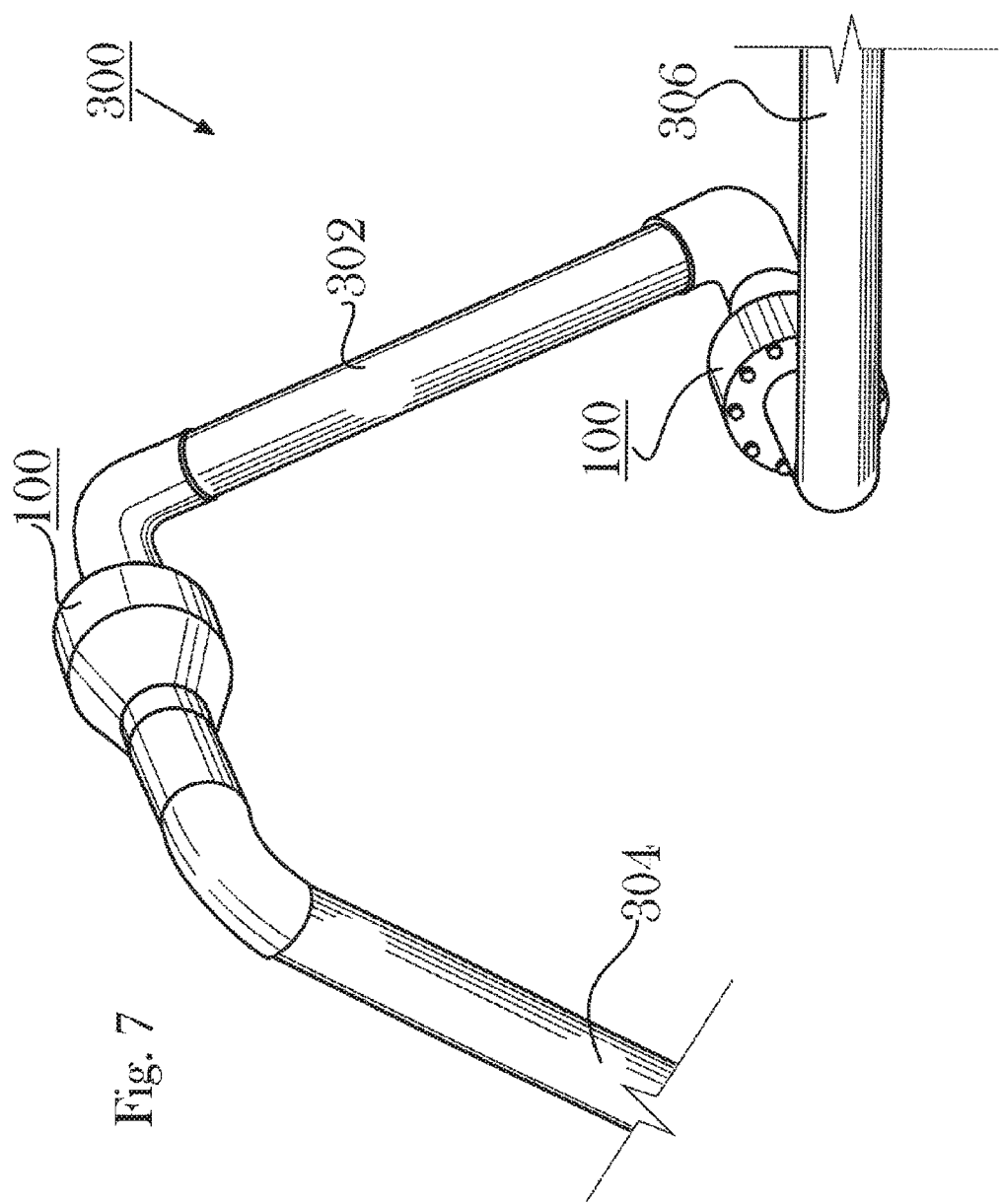
FIG. 7 is a schematic perspective view of a pipe connection using two rotary couplings.

Referring now to FIG. 7 which depicts a two coupling configuration 300 include the following components namely: joiner pipe 302, inlet pipe 304, outlet pipe 306 and two rotary couplings 100.

In practice A frame configuration 200 and/or two coupling configuration 300 may be used in order to accommodate thermal expansion contraction and movement of interconnecting pipes in a piping system.

Some of the advantages of the rotary coupling are as follows.

The rotary coupling can be adjusted to relieve the load on the packing member while not affecting the length & orientation of inner or outer section by backing off the compression screws.

The rotary coupling can be adjusted to compensate for seal degradation over time while not affecting the length & orientation of the inner or outer sections by tightening the compression screws The rotary coupling uses a packing relief 140 in seal end 134 of connector pipe 104 to create a pressure activated seal from the internal media pressure.

The rotatory coupling uses compression packing to create an internal seal containing hot and corrosive media. This is possible through careful selection of material for packing seals 106. The simple annular ring shape and design of packing seals allows a multitude of different materials to be used for packing seals 106.

The rotary coupling employs an offset gland ring or Z-ring 108 to allow for a packing chamber 150 as close as possible to the OD of connector pipe 104.

The rotary coupling provides a smooth internal flow path with allowing a full 360 degree of rotation between the connector pipe 104 and outer section 102 for pipe sizes larger than 2".

The rotary coupling arranged in such a manner to allow for thermal growth between two ends of a system by providing a pipe gap 181 and a shoulder gap 183.

It should be apparent to persons skilled in the arts that various modifications and adaptation of this structure described above are possible without departure from the spirit of the invention the scope of which defined in the appended claim.

We claim:
1. A rotary coupling comprising:
   a) an annular outer section which includes a female end, a threaded portion, and a Z-ring relief;
   b) a connector pipe which includes a connection end, a shoulder, and a seal end which is inserted into the female end of the outer section;
   c) a Z-ring housed within the Z-ring relief and packing seals housed within a packing chamber;

d) a retainer ring threadably received into the threaded portion of the annular outer section, the retainer ring receiving compression screws there-through, wherein in the engaged position the compression screws urge a packing end of the Z-ring longitudinally against the packing seals thereby compressing the packing seals into the packing chamber creating a seal against the seal end of the connector pipe;

e) wherein the Z-ring including an inner step portion and an outer step portion wherein a diameter of the inner step portion is less than a diameter of the outer step portion and the Z-ring relief includes an inner portion receiving the inner step portion and an outer portion receiving the outer step portion.

2. The rotary coupling claimed in claim 1 wherein the compression screws are moveable between an engaged position and a disengaged position such that in the disengaged position the compression pressure against the z-ring and packing seals is released by backing off the compression screws without disassembly of the rotary coupling.

3. The rotary coupling claimed in claim 1 further including a pipe gap between an abutment and a seal end of the connector pipe.

4. The rotary coupling claimed in claim 1 wherein one wall of the packing chamber includes the outer diameter of the connector pipe.

5. The rotary coupling claimed in claim 1 wherein boundaries of the packing chamber are defined by an outer diameter of the connector pipe, the packing end of the Z-ring, a chamber bottom and a chamber outer diameter of the outer section.

6. A rotary coupling comprising:
a) an annular outer section which includes a female end, a threaded portion, and a Z-ring relief;
b) a connector pipe which includes a connection end, a shoulder, and a seal end which is inserted into the female end of the outer section;
c) a Z-ring housed within the Z-ring relief and packing seals housed within a packing chamber;
d) a retainer ring threadably received into the threaded portion of outer section, the retainer ring receiving compression screws there-through, wherein in the engaged position the compression screws urging a packing end of Z-ring longitudinally against packing seals thereby compressing the packing seals into the packing chamber creating a seal, wherein the seal end of the connector pipe includes a packing relief defined by a taper having a varying diameter along the connector pipe.

7. The rotary coupling claimed in claim 6 wherein an inner diameter of the packing relief is less than an outer diameter of the connector pipe.

8. The rotary coupling claimed in claim 6 wherein the taper includes a variation in an outer diameter of the connector pipe so as to have a wider diameter closer to the seal end of the connector pipe.

9. A rotary coupling comprising:
a) an annular outer section which includes a female end, a threaded portion, and a Z-ring relief;
b) a connector pipe which includes a connection end, a shoulder, and a seal end which is inserted into the female end of the outer section, the shoulder extending radially outward from the connector pipe at a location between the connection end and the seal end;
c) a Z-ring housed within the Z-ring relief and packing seals housed within a packing chamber;
d) a retainer ring threadably received into the threaded portion of outer section and engaging the shoulder of the connector pipe, the retainer ring receiving compression screws there-through, wherein in the engaged position the compression screws urging a packing end of Z-ring longitudinally against packing seals thereby compressing the packing seals into the packing chamber creating a seal.

10. The rotary coupling according to claim 9 wherein the compression screws are moveable between an engaged position and disengaged position such that in the disengaged position the compression pressure against the z-ring and packing seals is released by backing off the compression screws without disassembly of the rotary coupling.

11. The rotary coupling according to claim 9 wherein the Z-ring includes an inner step portion and an outer step portion wherein a diameter of the inner step portion is less than a diameter of the outer step portion.

12. The rotary coupling according to claim 9 further including a pipe gap between an abutment and a seal end of the connector pipe.

13. The rotary coupling according to claim 9 wherein one wall of the packing chamber includes the outer diameter of the connector pipe.

14. The rotary coupling according to claim 9 wherein the seal end of the connector pipe includes a packing relief defined by a taper having a varying diameter along the connector pipe.

15. The rotary coupling according to claim 14 wherein an inner diameter of the packing relief is less than the outer diameter of connector pipe.

16. The rotary coupling according to claim 14 wherein the taper includes a variation in the outer diameter of the connector pipe so as to have a wider diameter closer to the seal end of the connector pipe.

17. The rotary coupling according to claim 9 wherein a boundary of the packing chamber is defined by an outer diameter of the connector pipe, the packing end of the Z-ring, a chamber bottom and a chamber outer diameter of the annular outer section.

* * * * *